Dec. 11, 1923.　　　　　　　　　　1,477,342
L. W. GATES
LOCK
Filed Jan. 3, 1922
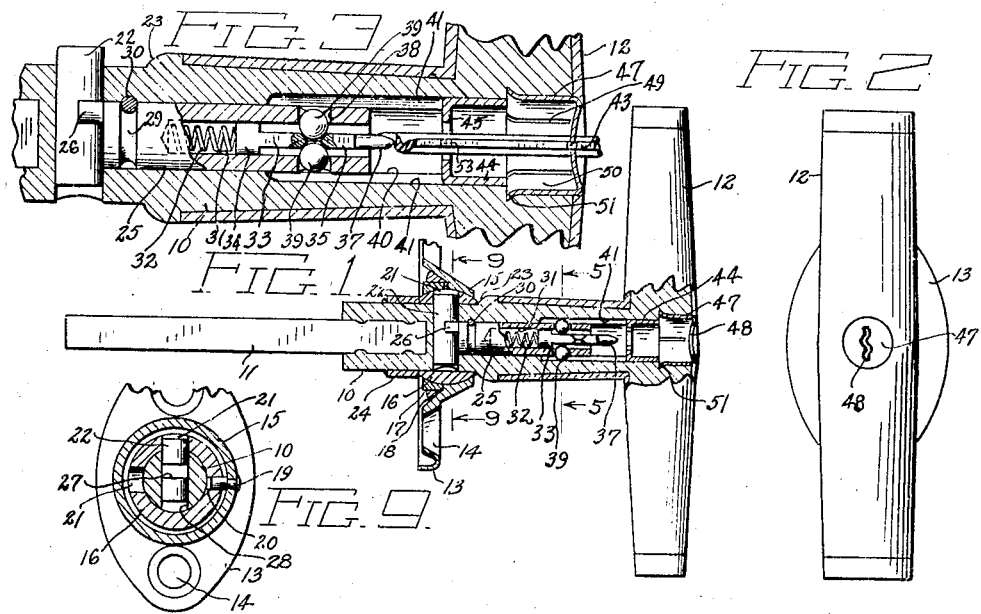
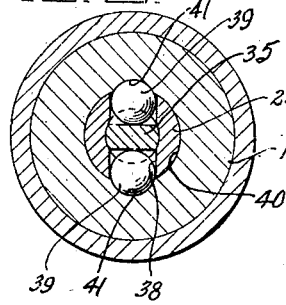
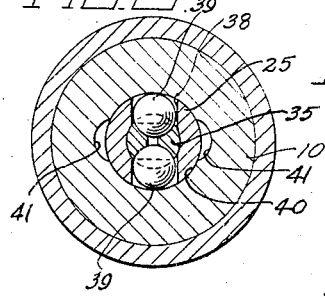
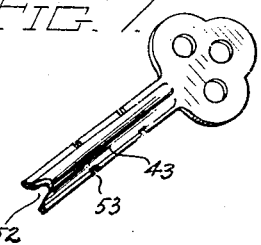
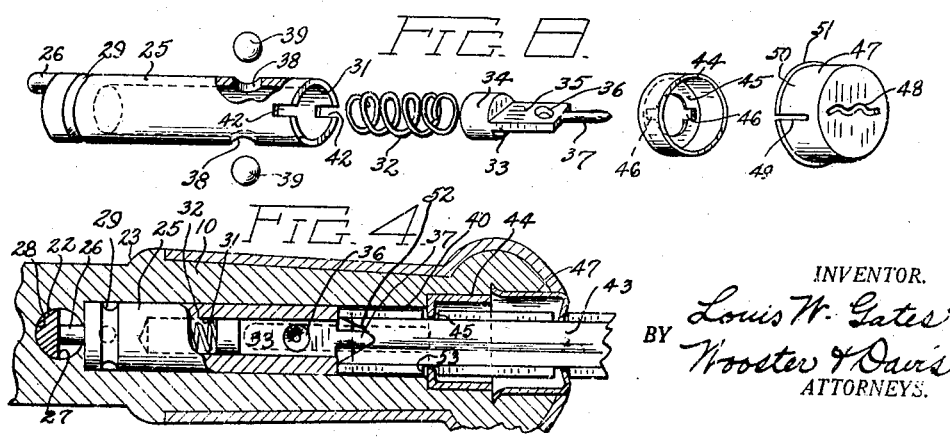
INVENTOR.
Louis W. Gates
BY Wooster & Davis
ATTORNEYS.

Patented Dec. 11, 1923.

1,477,342

UNITED STATES PATENT OFFICE.

LOUIS W. GATES, OF NEW HAVEN, CONNECTICUT, ASSIGNOR TO C. COWLES & COMPANY, OF NEW HAVEN, CONNECTICUT, A CORPORATION OF CONNECTICUT.

LOCK.

Application filed January 3, 1922. Serial No. 526,526.

*To all whom it may concern:*

Be it known that I, LOUIS W. GATES, a citizen of the United States, residing at New Haven, county of New Haven, State of Connecticut, have invented an Improvement in Locks, of which the following is a specification.

This invention relates to locks and is of general application though I have illustrated and described it as applied to a handle for an automobile door.

It is an object of the invention to provide a cheap and effective lock that is simple in construction and not likely to be easily gotten out of order, and which cannot be easily picked.

With the foregoing and other objects in view I have devised the improved lock illustrated in the accompanying drawings in which Fig. 1 is a longitudinal section through a lock operating spindle showing my device applied thereto.

Fig. 2 is an end view looking from the right of Fig. 1.

Fig. 3 is a longitudinal section through the bolt operating means on a somewhat enlarged scale.

Fig. 4 is a similar view to Fig. 3 but with the plane of the section taken at right angles to that of Fig. 3.

Fig. 5 is a transverse section substantially on the line 5—5 of Fig. 1.

Fig. 6 is a transverse section on the same plane as Fig. 5, but showing the spindle turned at an angle of 90° from the position shown in Fig. 5.

Fig. 7 is a perspective view of a key adapted for this type of lock.

Fig. 8 is a perspective, exploded view of the elements of the bolt operating mechanism, and Fig. 9 is a transverse section substantially on the line 9—9 of Fig. 1.

By way of illustration I have shown my lock in the drawing, as applied to a lock operating spindle for vehicle door locks. It, however, is not limited to use in this type of lock, but is adapted for any lock employing a lock operating spindle, or it may be used to operate any movable locking bolt whether used with a lock operating spindle or not.

The spindle I have indicated as a whole by the reference numeral 10 and comprises the usual square extension 11 for operating the latch of the lock, and some form of handle 12 to be gripped by the operator for operating the spindle. In the embodiment illustrated, an escutcheon 13 is secured to the outer surface of the door by any suitable means, such as screws (not shown) passing through the openings 14. This escutcheon is also provided with an outwardly projecting flange 15 provided with a substantially spherical recess adapted to receive the spherical bearing 16, within which the spindle 10 is mounted to turn. This bearing is retained in the recess of the escutcheon by means of a ring 17 secured to the escutcheon by suitable means, such as solder 18. A pin 19 carried by the escutcheon projects into an elongated slot 20 in the bearing 16 and prevents rotation of this bearing in the plane of the escutcheon, or about the axis of the spindle. It, however, allows the spindle to rock laterally with respect to the escutcheon to allow the escutcheon to rest flush with the surface of the door with the spindle extending horizontally. The bearing 16 is provided with transverse openings 21 located substantially 90° apart, as shown in Fig. 9, and they are adapted to receive the end of a locking bolt 22 carried by the spindle, which is slidable transversely thereof and may be retracted into the spindle to allow turning thereof within the bearing. It will be apparent that, when the bolt is projected into one of these openings 21, the spindle cannot be rotated because the pin 19 prevents rotation of the bearing.

The spindle is provided with a shoulder 23 adapted to abut against the outer end of the bearing 16, and is held against withdrawal therefrom by any suitable means, such as a collar 24 on the other side of the bearing secured to the spindle by any suitable means. This specific structure of the escutcheon, and means for mounting the spindle therein, is not a part of this present invention but is described and claimed in an application for locking handle filed December 26, 1921.

The key controlled mechanism for operating the bolt 22 is mounted within the spindle and comprises a rotatable cylinder 25 provided at its inner end with an eccentrically arranged projecting pin 26 adapted to enter a transverse channel 27 in the bolt 22. It will be clear from this arrangement that rotation of the cylinder will slide the bolt back and forth within the transverse opening 28 in the spindle, this bolt being not of greater length than the diameter of the spindle so that it may be wholly retracted into the same. The cylinder 25 may be retained in the spindle by any suitable means but I prefer to provide an annular groove 29 in the outer wall thereof and pass a pin 30 through the spindle and this groove.

The cylinder 25 is bored at 31 to receive a suitable spring 32 and a sliding cam or wedge element 33. This element has a cylindrical portion 34 at one end to guide it within the bore 31, and is flattened at 35 for the rest of its length with two recesses 36 on opposite sides thereof provided with inclined side walls, as shown. This element is also provided with a projecting pin 37 beyond the end of the flattened portion for a purpose presently to be described.

The cylinder is provided with two lateral openings 38 to receive two retaining elements 39, preferably in the form of balls, and the wall of bore 40 is provided with longitudinally extending grooves 41 adapted to receive a portion of these balls under certain conditions, presently to be described, to prevent rotation of the cylinder 25 with respect to the spindle. The outer end of the spindle is provided with transverse slots 42 to receive the end of a key 43 whereby the cylinder may be turned to operate the bolt.

Beyond the end of the cylinder is a bushing 44 which is forced into the bore 40 of the spindle, this bushing being open at one end and provided with an inwardly extending flange 45 at the other end having oppositely disposed grooves 46 therein. A second bushing 47 is placed in the outer end of the bore 40 of the handle and is provided with a key-slot 48 of a contour corresponding to that of the cross section of the key. This bushing is slotted from its inner end at 49 to form spring sections 50 and is provided with outwardly extending flange portions 51 adapted to enter a groove within the handle to prevent withdrawal of the bushing but to allow turning therein with the key.

The operation is as follows:

Figs. 1, 5 and 9 illustrate the elements in locked position, the cam or wedge element 33 being projected outwardly under the action of the spring 32, with the balls 39 held within the grooves or recesses 41 by the flat portion 35 of the cam element. It will be evident that, in this position, the balls prevent turning of the cylinder with respect to the spindle. To unlock the spindle the key 43 is inserted through the slot 48 and the grooves 46 in the bushing 44, which is so placed that when the spindle is locked these grooves 46 are in alignment with the slots 42 in the end of the cylinder 25, so that the end of the key is guided into these slots 42. The end of the key is provided with a recess 52 against the bottom of which the end of the pin 37 is adapted to rest, and the length of this pin and the depth of the recess are so proportioned that, when the end of the key rests against the bottom of the slots 42, the recesses 36 in the cam element are in alignment with the openings 38 in the cylinder, and allows the balls 39 to retract from the grooves 41, as shown in Figs. 3 and 6, so that the cylinder 25 may be rotated by turning the key, to withdraw the bolt 22 from an opening 21 to unlock the spindle. The edges of the key are provided with notches 53 placed at a distance from the end thereof corresponding to the distance from the bottom of the slots 42 to the flange 45 of the bushing 44, so that the key may turn in this bushing. As soon as the key is removed, the cam or wedge element 33 is moved to the position shown in Fig. 1 under the action of spring 32 to retain the retaining elements 39 in contact with the grooves or recesses 41.

It will be noted that there are a number of different ways for varying the key combination, one of them being by varying the depth of the recess 52 and length of projecting pin 37 with respect to the bottom of slots 42, another being to vary the location of the bushing 44 in the spindle and, therefore, changing the location of the notches 53 in the edge of the key. Still another way is to vary the shape of the key-slot 48 and, therefore, the shank of the key.

It will also be apparent that the lock is not easily picked. If a wire were inserted to pick the lock, it would be very difficult to release the retaining elements 39 therewith, because it would be difficult to retain this wire on the end of the projecting pin 37 to push the cam element 33 inwardly, and it would be difficult to insert larger elements because of the shape of the key-slot 48. The construction is, however, simple and may be easily and cheaply manufactured and is not liable to be easily gotten out of order.

Having thus described the nature of my invention, what I claim is:

1. In a lock a movable element, means for operating said element comprising a rotatable cylinder, an operative connection between the cylinder and element, said cylinder being bored to receive a spring and a sliding cam element having inclined surfaces, said cylinder being provided with holes adjacent said cam element, a casing surrounding said cylinder provided with recesses adjacent said cylinder, and retaining elements in said holes and adapted to coact with the inclined surfaces of the cam element whereby they are moved to engagement with said recesses.

2. A lock comprising a movable element, a rotatable cylinder having operative connection with said element, a sliding cam element within the cylinder, said cylinder also having notches in the end thereof, a casing about said cylinder provided with a recess, retaining means carried by the cylinder and adapted to coact with the recess to prevent turning movement of the cylinder, a key adapted to be inserted in the notches in the end of the cylinder and limited in its inward movement thereby and having a notch in its end proportioned with respect to the cam element to hold it in position to release the retaining means when the key is inserted in the notches in the cylinder, and a spring to move the cam element in the opposite direction when the key is removed, said cam element being adapted to coact with the retaining means on said latter movement to place it in engagement with said recess and retain it therein.

3. A lock comprising a movable element, a rotatable cylinder having operative connections with said element, said cylinder being bored to receive a spring and a sliding cam element having an inclined surface, said cylinder being provided with a transverse opening therein, a ball in said opening, and a casing about said cylinder provided with a recess adjacent said opening, said ball and inclined surface coacting on movement of the cam element in one direction to move the ball into engagement with the recess in the casing.

4. A lock comprising a movable element, means for operating the element comprising a rotatable cylinder, an operative connection between the cylinder and element, a casing about the cylinder, coacting means carried by the casing and cylinder to lock the cylinder against rotation, said cylinder being provided with notches in the end thereof, a key having a recess in its end providing spaced projections adapted for insertion in the notches to rotate the cylinder, and means carried by the cylinder having a projecting pin cooperating with the recess in the key when so inserted to release the locking means.

5. A lock comprising a movable element, means for operating the element comprising a rotatable cylinder, an operative connection between the cylinder and element, a casing about the cylinder, coacting means carried by the casing and cylinder to lock the cylinder against rotation, said cylinder being provided with notches in the end thereof, a key adapted for insertion in the notches to rotate the cylinder and having notches in the sides thereof, means carried by the cylinder adapted to cooperate with the key to release the locking means, and a bushing in the casing provided with a notched flange cooperating with the key to prevent rotation thereof except when the key is in position to release said locking means, said bushing being independent of the cylinder.

6. In combination a lock operating spindle, a locking bolt carried thereby, means for operating the bolt comprising a cylinder bored to receive a spring and a movable cam element in position to be operated by said spring, said spindle being provided with a recess adjacent said cylinder, and a securing element carried by the cylinder and adapted to be moved to and held in engagement with said recess by the cam element.

7. In combination a lock operating spindle, a locking bolt carried thereby, means for operating said bolt comprising a rotatable cylinder extending within the spindle and longitudinally thereof, operative connection between the cylinder and bolt, said cylinder being bored to receive a spring and a sliding cam element having inclined surfaces, said cylinder being provided with holes adjacent said cam element, and the spindle being provided with recesses adjacent said cylinder, and retaining elements in said holes and adapted to coact with the inclined surfaces of the cam element whereby they are moved to engagement with said recesses.

8. In combination a lock operating spindle, a locking bolt carried thereby, a rotatable cylinder within the spindle and having operative connection with said bolt, a sliding cam element within the cylinder, said spindle being provided with a recess, and a retaining element carried by the cylinder adapted to be moved into engagement with said recess by the cam element upon movement of the said cam element in one direction and to be retracted therefrom upon movement of the cam element in the opposite direction.

9. In combination a lock operating spindle, a locking bolt carried thereby, a rotatable cylinder within the spindle and having operative connection with said bolt, a sliding cam element within the cylinder, said cylinder also having notches in the end thereof, the spindle being provided with a recess, retaining means carried by the cylinder and adapted to coact with the recess to prevent turning movement of the cylinder, a key adapted to be inserted in the notches in the end of the cylinder and having a notch in its end proportioned with respect to the cam element to hold it in position to release the retaining means when the key is inserted in the notches in the cylinder, and a spring to move the cam element in the opposite direction when the key is removed, said cam element being adapted to coact with the retaining means on said latter movement to place it in engagement with said recess and retain it therein.

10. In combination a lock operating spindle, a locking bolt carried thereby, means for operating the bolt comprising a rotatable cylinder in the spindle, an operative connection between the cylinder and bolt, said cylinder being bored to receive a spring and a sliding cam element having an inclined surface, said cylinder being provided with a transverse opening, and a ball in said opening, the spindle being provided with a recess adjacent said opening, said ball and inclined surface coacting on movement of the cam element in one direction to move the ball into engagement with the recess in the spindle.

11. In combination a lock operating spindle, a locking bolt carried thereby, means for operating the bolt comprising a rotatable cylinder in the spindle, an operative connection between the cylinder and bolt, coacting means carried by the spindle and cylinder to lock the cylinder against rotation, said cylinder being provided with notches in the end thereof, a key having a recess in its end providing spaced projections adapted for insertion in the notches to rotate the cylinder, and means carried by the cylinder having a projecting pin cooperating with the recess in the key when so inserted to release the locking means.

12. In combination a lock operating spindle, a locking bolt carried thereby, means for operating the bolt comprising a rotatable cylinder in the spindle, an operative connection between the cylinder and bolt, coacting means carried by the spindle and cylinder to lock the cylinder against rotation, said cylinder being provided with notches in the end thereof, a key adapted for insertion in the notches to rotate the cylinder and having notches in the sides thereof, means carried by the cylinder adapted to cooperate with the key to release the locking means, and a bushing in the spindle provided with a notched flange cooperating with the key to prevent rotation thereof except when the key is in position to release said locking means, said bushing being independent of the cylinder.

In testimony whereof I affix my signature.

LOUIS W. GATES.